(12) United States Patent
Chen (10) Patent No.: US 10,937,384 B2
(45) Date of Patent: Mar. 2, 2021

(54) ELECTROSTATIC DISCHARGE CIRCUIT AND DISPLAY PANEL

(71) Applicants: HKC Corporation Limited, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen (CN); Chongqing HKC Optoelectronics Technology Co., Ltd., Congqing (CN)

(*) Notice: Subject to any disclaimer, the term of this patent is extended or adjusted under 35 U.S.C. 154(b) by 0 days.

(21) Appl. No.: 16/632,055

(22) PCT Filed: Dec. 13, 2017

(86) PCT No.: PCT/CN2017/115797
§ 371 (c)(1),
(2) Date: Jan. 17, 2020

(87) PCT Pub. No.: WO2019/015235
PCT Pub. Date: Jan. 24, 2019

(65) Prior Publication Data
US 2020/0243036 A1    Jul. 30, 2020

(30) Foreign Application Priority Data
Jul. 21, 2017   (CN) ............................ 2017 1 0605497

(51) Int. Cl.
*G09G 3/36*    (2006.01)
(52) U.S. Cl.
CPC ......... *G09G 3/3696* (2013.01); *G09G 3/3677* (2013.01); *G09G 3/3688* (2013.01); *G09G 2310/0248* (2013.01)

(58) Field of Classification Search
CPC .. G09G 3/3696; G09G 3/3677; G09G 3/3688; G09G 2310/0248; G09G 2330/06; G09G 3/3648; H02H 9/04; G02F 1/133
See application file for complete search history.

(56) References Cited

U.S. PATENT DOCUMENTS

| 5,675,352 | A | * | 10/1997 | Rich ........................ G09G 3/18 345/89 |
| 2002/0008799 | A1 | * | 1/2002 | Ota .................... G02F 1/134363 349/43 |

(Continued)

FOREIGN PATENT DOCUMENTS

| CN | 101577418 A | 11/2009 |
| CN | 103944154 A | 7/2014 |

(Continued)

*Primary Examiner* — Andrew Sasinowski
(74) *Attorney, Agent, or Firm* — Muncy, Geissler, Olds & Lowe, P.C.

(57) ABSTRACT

An electrostatic discharge circuit and a display panel are provided. The electrostatic discharge circuit comprises a first discharge unit, a second discharge unit and a third discharge unit. The first discharge unit comprises a first transistor and a second transistor, and a source of the first transistor is connected to a high level terminal. The gate and drain of the first transistor and the gate and drain of the second transistor are connected to an electrostatic input terminal. A source of the second transistor is connected to a low level terminal. An input terminal of the second discharge unit is connected to the electrostatic input terminal, an output terminal of the second discharge unit is connected to a common terminal. An input terminal of the third discharge unit is connected to the electrostatic input terminal, an output terminal of the third discharge unit is connected to the common terminal.

20 Claims, 4 Drawing Sheets

(56) References Cited

U.S. PATENT DOCUMENTS

| | | | |
|---|---|---|---|
| 2005/0068266 A1* | 3/2005 | Sano | G09G 3/296 345/60 |
| 2006/0001098 A1 | 1/2006 | Yang et al. | |
| 2009/0002586 A1* | 1/2009 | Kimura | G09G 3/3659 349/39 |
| 2009/0224245 A1* | 9/2009 | Umezaki | G02F 1/136286 257/59 |

FOREIGN PATENT DOCUMENTS

| | | |
|---|---|---|
| CN | 105280632 A | 1/2016 |
| CN | 106932987 A | 7/2017 |
| CN | 106959562 A | 7/2017 |
| JP | 2009063695 A | 3/2009 |

\* cited by examiner

ELECTROSTATIC DISCHARGE CIRCUIT AND DISPLAY PANEL

BACKGROUND

Technical Field

This disclosure relates to a technical field of a display, and more particularly to an electrostatic discharge circuit and a display panel.

RELATED ART

Liquid crystal display has many advantages including the thin body, the power saving property and the radiation-free property and is widely applied. The existing liquid crystal displays are mainly backlight liquid crystal display which comprises a liquid crystal panel and a backlight module. The work principle of the liquid crystal display is that the liquid crystal molecules are placed between two parallel glass substrates, and a drive voltage is applied to the two glass substrates to control the rotating directions of the liquid crystal molecules so as to refract the light from the backlight module to generate an image.

TFT-LCD (Thin Film Transistor-Liquid Crystal Display) has gradually occupied the dominant position in the display field due to its low power consumption, excellent image quality and high production yield. Similarly, the TFT-LCD comprises a liquid crystal panel and a backlight module. The liquid crystal panel comprises a CF substrate (Color Filter Substrate) and a TFT substrate (Thin Film Transistor Substrate). Transparent electrodes are provided on opposite inner sides of the substrates. A layer of liquid crystal (LC) is interposed between the two substrates.

Electrostatic discharge (referred to as ESD) exceeding a certain voltage can breakdown the integrated circuit chip dielectrics, fuse the core wire, increase the leakage current to accelerate aging, and change the electrical performance parameters and so on. Therefore, ESD protection is quite important.

SUMMARY

The technical problem to be solved by this disclosure is to provide an electrostatic discharge circuit having a reliable and effective protection circuit.

In addition, this disclosure further provides a display panel comprising the above-mentioned electrostatic discharge circuit.

The objective of this disclosure is achieved through the following technical solutions:

An electrostatic discharge circuit, comprising a first discharge unit, a second discharge unit and a third discharge unit. The first discharge unit comprises a first transistor and a second transistor. A source of the first transistor is connected to a high level terminal. A gate and a drain of the first transistor are connected together to form a first pole. A gate and a drain of the second transistor are connected together to form a second pole. The first pole and the second pole are connected together and connected to an electrostatic input terminal. A source of the second transistor is connected to a low level terminal. An input terminal of the second discharge unit is connected to the electrostatic input terminal. An output terminal of the second discharge unit is connected to a common terminal. An input terminal of the third discharge unit is connected to the electrostatic input terminal. An output terminal of the third discharge unit is connected to the common terminal.

In one embodiment, the second discharge unit comprises a first electroconductive wire having one end connected to the common terminal, and the common terminal is grounded; or the second discharge unit comprises a first electroconductive wire having one end connected to the common terminal, the electrostatic discharge circuit is disposed on a display panel, and the common terminal is connected to a common voltage terminal of the display panel. The required line width of the electroconductive wire used between the high level terminal (VGH) and the low level terminal (VGL) is small. This is equivalent to a larger resistance, the discharge current is also relatively smaller, and the discharge ability provided by the first discharge unit alone may not be sufficient. However, the first electroconductive wire is connected to the ground (GND). Alternatively, the first electroconductive wire is connected to the common voltage terminal (VCOM), and its line width is far greater than the line widths of the VGH and VGL, so the current that can be discharged will be higher than the original current so as to achieve a better protective effect.

In one embodiment, the third discharge unit comprises a second electroconductive wire having one end connected to the common terminal, and the common terminal is grounded; or the third discharge unit comprises a second electroconductive wire having one end connected to the common terminal, and the common terminal is connected to a common voltage terminal of the display panel. The required line width of the electroconductive wire used between the high level terminal (VGH) and the low level terminal (VGL) is small. This is equivalent to a larger resistance, the discharge current is also relatively smaller, and the discharge ability provided by the first discharge unit alone may not be sufficient. However, the first electroconductive wire is connected to the ground (GND). Alternatively, the first electroconductive wire is connected to the common voltage terminal (VCOM), and its line width is far greater than the line widths of the VGH and VGL, so the current that can be discharged will be higher than the original current so as to achieve a better protective effect.

In one embodiment, the second discharge unit comprises a third transistor, and an input terminal and a control terminal of the third transistor are connected to the electrostatic input terminal, and an output terminal of the third transistor is connected to the common terminal. The third discharge unit comprises a fourth transistor, and an input terminal and a control terminal of the fourth transistor are connected to the electrostatic input terminal, and an output terminal of the fourth transistor is connected to the common terminal. The second discharge unit discharges through the third transistor, and the configuration is simple, effective and reliable. The third discharge unit discharges through the fourth transistor, and the configuration is simple, effective and reliable.

In one embodiment, the second discharge unit comprises a first capacitor, and a first terminal of the first capacitor is connected to the electrostatic input terminal, and a second terminal of the first capacitor is connected to the control terminal of the third transistor. The third discharge unit comprises a second capacitor, and a first terminal of the second capacitor is connected to the electrostatic input terminal, and a second terminal of the second capacitor is connected to the control terminal of the fourth transistor. According to the properties that the capacitor can block the DC, conduct the AC, conduct the high frequency and block the low frequency, when the voltage range is from VGL to VGH, the second discharge unit and the third discharge unit do not work. At the same time, when the voltage range is not from VGL to VGH, for example, when there is applied with a positive high voltage instantaneously, the second discharge unit can work normally, and does not generate the current of VGL left through the second transistor. For example, when there is applied with a negative high voltage instantaneously, the third discharge unit can work normally.

In one embodiment, the second discharge unit comprises a fifth transistor, and an input terminal of the fifth transistor is connected to the second terminal of the first capacitor, a control terminal of the fifth transistor is connected to the high level terminal, and an output terminal of the fifth transistor is connected to the low level terminal. The third discharge unit comprises a sixth transistor, and an input terminal of the sixth transistor is connected to the second terminal of the second capacitor, a control terminal of the sixth transistor is connected to the low level terminal, and an output terminal of the sixth transistor is connected to the high level terminal. At the positive voltage, the fifth transistor, which is turned on, further completes the discharge function of the second discharge unit, and the potential of the second terminal of the first capacitor is pulled to be consistent with the common terminal at the same time. In this manner, when the voltage range is from VGL to VGH, the third transistor cannot be turned on to discharge and affect the normal work of the protection circuit. At the negative voltage, the sixth transistor, which is turned on, further completes the discharge function of the third discharge unit, and the potential of the second terminal of the second capacitor is pulled to be consistent with the common terminal at the same time. In this manner, when the voltage range is from VGL to VGH, the fourth transistor cannot be turned on to discharge and affect the normal work of the protection circuit.

In one embodiment, the first transistor is a first N-type transistor, the second transistor is a second P-type transistor, the third transistor is a third N-type transistor, the fourth transistor is a fourth P-type transistor, the fifth transistor is a fifth N-type transistor, and the sixth transistor is a sixth P-type transistor. Here shows an implementation aspect of the electrostatic discharge circuit, clearly and specifically adopted electrical components and connection relationships.

In one embodiment, the first transistor is a first N-type transistor, the second transistor is a second P-type transistor, the third transistor is a third P-type transistor, the fourth transistor is a fourth N-type transistor, the fifth transistor is a fifth N-type transistor, and the sixth transistor is a sixth P-type transistor. Here shows an implementation aspect of the electrostatic discharge circuit, clearly and specifically adopted electrical components and connection relationships.

According to another aspect of this disclosure, this disclosure further provide an electrostatic discharge circuit. The electrostatic discharge circuit comprises a first discharge unit, a second discharge unit and a third discharge unit. The first discharge unit comprises a first N-type transistor and a second P-type transistor. A source of the first N-type transistor is connected to a high level terminal. A gate and a drain of the first N-type transistor are connected together to form a first pole. A gate and a drain of the second P-type transistor are connected together to form a second pole. The first pole and the second pole are connected together and connected to an electrostatic input terminal. A source of the second P-type transistor is connected to a low level terminal. The second discharge unit comprises a third N-type transistor, a first capacitor, and a fifth N-type transistor. A source of the third N-type transistor is connected to the gate of the first N-type transistor. A drain of the third N-type transistor is connected to a common terminal, the common terminal is grounded. A first terminal of the first capacitor is connected to the electrostatic input terminal. A second terminal of the first capacitor is connected to a gate of the third N-type transistor. A source of the fifth N-type transistor is connected to the second terminal of the first capacitor. A gate of the fifth N-type transistor is connected to the high level terminal. A drain of the fifth N-type transistor is connected to the low level terminal, and the second discharge unit functions to discharge when a positive voltage is applied. The third discharge unit comprises a fourth P-type transistor, a second capacitor and a sixth P-type transistor. A source of the fourth P-type transistor is connected to the gate of the second P-type transistor. A drain of the fourth P-type transistor is connected to the common terminal, the common terminal is grounded. A first terminal of the second capacitor is connected to the electrostatic input terminal. A second terminal of the second capacitor is connected to a gate of the fourth P-type transistor. A source of the sixth P-type transistor is connected to the second terminal of the second capacitor. A gate of the sixth P-type transistor is connected to the low level terminal. A drain of the sixth P-type transistor is connected to the high level terminal, and the third discharge unit functions to discharge when a negative voltage is applied.

According to still another aspect of this disclosure, this disclosure further provide a display panel. The display panel comprises a substrate, signal lines and the electrostatic discharge circuit. An active switch is disposed on the substrate. The signal lines are disposed on the substrate and coupled to the active switch, and the signal lines comprise multiple scan lines and multiple data lines, and the multiple data lines and the multiple scan lines successively intersect to form multiple pixel areas. The electrostatic discharge circuit is disposed on the substrate.

In one embodiment, the display panel further comprises a gate drive circuit and a source drive circuit, which are disposed on the substrate.

In this disclosure, because the second discharge unit and the third discharge unit are connected to and cooperate with the first discharge unit, no matter whether there is a positive or negative high voltage instantaneously applied to the electrostatic input, respectively cooperating with the second discharge unit and the third discharge unit outside the first discharge unit can increase the ESD discharge current path, so that the speed and amount of discharge can be increased, a better protection effect on the display panel is achieved, and the lifetime is extended.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings.

DETAILED DESCRIPTION OF THE INVENTION

Specific structural and functional details disclosed herein are merely representative and are for purposes of describing example embodiments of the present invention. However, the present invention may be embodied in many alternate forms, and should not be interpreted as being limited to the embodiments set forth herein.

In the description of the present invention, it is to be understood that the term "center", "lateral", "upper", "lower", "left", "right", "vertical", "horizontal", "top", "bottom", "inner", "outer" and other indicated orientation or positional relationships are based on the location or position relationship shown in the drawings, and are for convenience of description of the present invention only and to simplify the description, and not indicate or imply that refers to devices or elements must have a specific orientation, the orientation of a particular configuration and operation, therefore, cannot be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present invention, unless otherwise specified, the meaning of "more" is two or more. Further, the term "comprising" and any variations thereof, are intended to cover non-exclusive inclusion.

In the description of the present invention, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present invention.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, as used herein the term "comprising" and/or "comprising," as used herein, specify the presence of stated features, integers, steps, operations, elements, and/or components, but do not preclude the presence or addition of one or more other features, integers, steps, operations, elements, components, and/or combinations thereof.

This disclosure will be further described in detail with reference to the accompanying drawings and specific embodiments below.

A schematic view of an electrostatic discharge circuit of the embodiment of this disclosure will be described below with reference to FIGS. 1 to 4.

Figure 1:
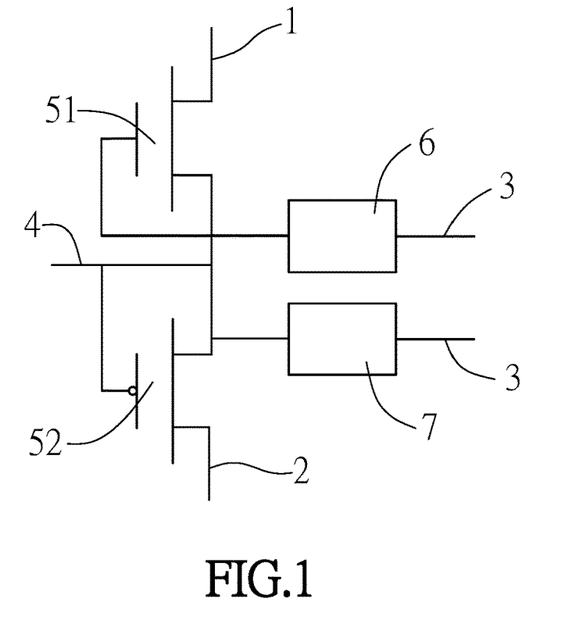
FIG. 1 is a schematic view showing an electrostatic discharge circuit of a display panel of the embodiment of this disclosure.
Figure 5:
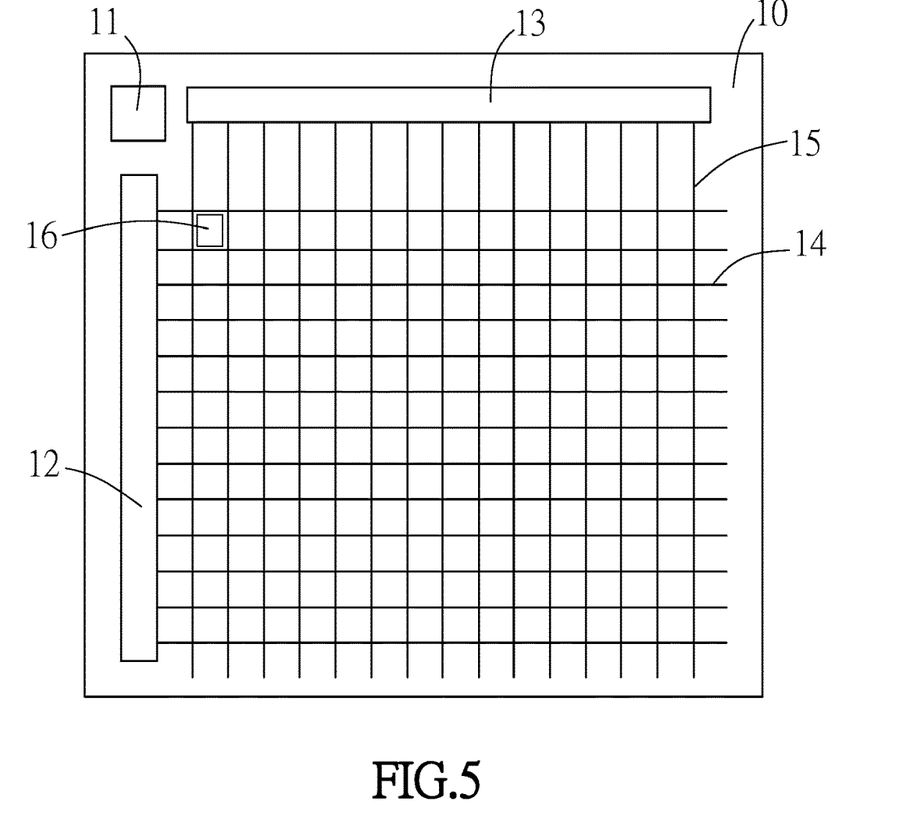
FIG. 5 is a schematic structure view showing a display panel of the embodiment of this disclosure.

As an embodiment of this disclosure, as shown in FIG. 1, an electrostatic discharge circuit 11 comprises a first discharge unit, a second discharge unit 6 and a third discharge unit 7. The first discharge unit comprises a first transistor and a second transistor, a source of the first transistor is connected to a high level terminal, a gate and a drain of the first transistor are connected together to form a first pole, a gate and a drain of the second transistor are connected together to form a second pole, the first pole and the second pole are connected together and connected to an electrostatic input terminal 4, and a source of the second transistor is connected to a low level terminal; an input terminal of the second discharge unit 6 is connected to the electrostatic input terminal 4, and an output terminal of the second discharge unit 6 is connected to a common terminal 3; and an input terminal of the third discharge unit 7 is connected to the electrostatic input terminal 4, and an output terminal of the third discharge unit 7 is connected to the common terminal 3. The second discharge unit 6 and the third discharge unit 7 are connected to and cooperate with the first discharge unit, no matter whether there is a positive or negative high voltage instantaneously applied to the electrostatic input 4, respectively cooperating with the second discharge unit 6 and the third discharge unit 7 outside the first discharge unit can increase the ESD discharge current path, so that the speed and amount of discharge can be increased, a better protection effect on the display panel is achieved, and the lifetime is extended. As shown in FIG. 5, the display panel comprises a substrate 10, signal lines and the electrostatic discharge circuit 11. An active switch is disposed on the substrate 10; the signal lines are disposed on the substrate 10 and coupled to the active switch, the signal lines comprise multiple scan lines 14 and multiple data lines 15, and the multiple data lines 15 and the multiple scan lines 14 successively intersect to form multiple pixel areas 16; the electrostatic discharge circuit 11, a gate drive circuit 12 and a source drive circuit 13 are disposed on the substrate 10, the horizontal disposed scan lines 14 and the vertical disposed data lines 15 are coupled and connected to their corresponding circuits, and the active switch may be, for example, a thin film transistor. The high level terminal, the low level terminal, the electrostatic input terminal 4 and the common terminal 3 are coupled to components of the display panel.

Specifically, the second discharge unit 6 comprises a first electroconductive wire having one end connected to the common terminal 3, and the common terminal 3 is grounded; alternatively, the second discharge unit 6 comprises a first electroconductive wire having one end connected to the common terminal 3, and the common terminal 3 is connected to a common voltage terminal of the display panel. The required line width of the electroconductive wire used between the high level terminal (VGH) 1 and the low level terminal (VGL) 2 is small. This is equivalent to a larger resistance, the discharge current is also relatively smaller, and the discharge ability provided by the first discharge unit alone may not be sufficient. However, the first electroconductive wire is connected to the ground (GND). Alternatively, the first electroconductive wire is connected to the common voltage terminal (VCOM), and its line width is far greater than the line widths of the VGH and VGL, so the current that can be discharged will be higher than the original current so as to achieve a better protective effect. The third discharge unit 7 comprises a second electroconductive wire having one end connected to the common terminal 3, and the common terminal 3 is grounded; alternatively, the third discharge unit 7 comprises a second electroconductive wire having one end connected to the common terminal 3, and the common terminal 3 is connected to the common voltage terminal of the display panel. However, the second electroconductive wire is connected to the ground (GND). Alternatively, the second electroconductive wire is connected to the common voltage terminal (VCOM), and its line width is far greater than the line widths of the VGH and VGL, so the current that can be discharged will be higher than the original current so as to achieve a better protective effect. The display panel comprises a gate integrated circuit, a high level terminal, a low level terminal connected to a transistor turn-on voltage terminal and a transistor turn-off voltage terminal of the gate integrated circuit, respectively.

Figure 2:
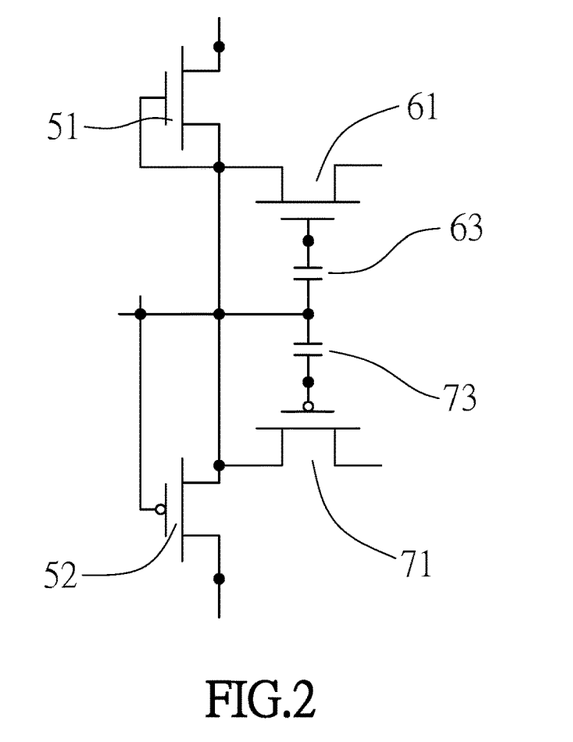
FIG. 2 is a schematic view showing an electrostatic discharge circuit of a display panel of the embodiment of this disclosure.

As one embodiment of this disclosure, an electrostatic discharge circuit 11 comprises a first discharge unit, a second discharge unit 6 and a third discharge unit 7. The first discharge unit comprises a first transistor and a second transistor, a source of the first transistor is connected to a high level terminal, a gate and a drain of the first transistor are connected together to form a first pole, a gate and a drain of the second transistor are connected together to form a second pole, the first pole and the second pole are connected together and connected to an electrostatic input terminal 4, and a source of the second transistor is connected to a low level terminal; an input terminal of the second discharge unit 6 is connected to the electrostatic input terminal 4, and an output terminal of the second discharge unit 6 is connected to a common terminal 3; and an input terminal of the third discharge unit 7 is connected to the electrostatic input terminal 4, and an output terminal of the third discharge unit 7 is connected to the common terminal 3. The second discharge unit 6 and the third discharge unit 7 are connected to and cooperate with the first discharge unit, no matter whether there is a positive or negative high voltage instantaneously applied to the electrostatic input 4, respectively cooperating with the second discharge unit 6 and the third discharge unit 7 outside the first discharge unit can increase the ESD discharge current path, so that the speed and amount of discharge can be increased, a better protection effect on the display panel is achieved, and the lifetime is extended. The second discharge unit 6 comprises a third transistor and a first capacitor 63, and an input terminal and a control terminal of the third transistor are connected to the electrostatic input terminal 4, and an output terminal of the third transistor is connected to the common terminal 3. A first terminal of a first capacitor 63 is connected to the electrostatic input terminal 4, and a second terminal of the first capacitor 63 is connected to the control terminal of the third transistor. The third discharge unit 7 comprises a fourth transistor and a second capacitor 73, and an input terminal and a control terminal of the fourth transistor are connected to the electrostatic input terminal 4, and an output terminal of the fourth transistor is connected to the common terminal 3. A first terminal of a second capacitor 73 is connected to the electrostatic input terminal 4, and a second terminal of the second capacitor 73 is connected to the control terminal of the fourth transistor. The second discharge unit 6 and the third discharge unit 7 respectively discharge through the third transistor and the fourth transistor, and the configuration is simple, effective and reliable. According to the properties that the capacitor can block the DC, conduct the AC, conduct the high frequency and block the low frequency, when the voltage range is from VGL to VGH, the second discharge unit 6 and the third discharge unit 7 do not work. At the same time, when the voltage range is not from VGL to VGH, for example, when there is applied with a positive high voltage instantaneously, the second discharge unit 6 can work normally, and does not generate the current of VGL left through the second transistor. For example, when there is applied with a negative high voltage instantaneously, the third discharge unit 7 can work normally. So, if the input voltage range of the PIN ranges from VGL to VGH, this capacitor and transistor do not operate because the capacitor in the DC current can be considered as an open circuit.

Specifically, as shown in FIG. 2, a first discharge unit comprises a first N-type transistor 51 and a second P-type transistor 52, and a source of the first N-type transistor 51 is connected to a high level terminal, a gate and a drain of the first N-type transistor 51 are connected together to form a first pole, a gate and a drain of the second P-type transistor 52 are connected together to form a second pole, the first pole and the second pole are connected together and connected to an electrostatic input terminal 4, and a source of the second P-type transistor 52 is connected to a low level terminal. A source of a third N-type transistor 61 is connected to a gate of a first N-type transistor 51, a drain of the third N-type transistor 61 is connected to the common terminal 3, the common terminal 3 is grounded, a first terminal of a first capacitor 63 is connected to the electrostatic input terminal 4, and a second terminal of the first capacitor 63 is connected to a gate of the third N-type transistor 61. A source of a fourth P-type transistor 71 is connected to a gate of a second P-type transistor 52, a drain of the fourth P-type transistor 71 is connected to the common terminal 3, the common terminal 3 is grounded, a first terminal of a second capacitor 73 is connected to the electrostatic input terminal 4, and a second terminal of the second capacitor 73 is connected to a gate of the fourth P-type transistor 71. When there is a positive high voltage instantaneously applied to the PIN, the first N-type transistor 51 is turned on, and a first discharge current 81 is generated. Because the PIN potential instantaneously becomes high, the potential of the point connected between the second terminal of the first capacitor 63 and the gate of the third N-type transistor 61 also becomes high at the same time under capacitive coupling special effects, and the third N-type transistor 61 is also turned on. At this time, the positive high voltage of the PIN can be discharged to GND. Because the GND trace is usually thicker than VGL, the corresponding resistance value is much smaller than VGL, so a second discharge current 82 is higher than the first discharge current 81. When there is a negative high voltage instantaneously applied to the PIN, the second P-type transistor 52 is turned on, and a fourth discharge current 91 is generated. Because the PIN potential instantaneously becomes negative, the second terminal of the second capacitor 73 also becomes negative at the same time under capacitive coupling special effects, the fourth P-type transistor 71 is also turned on, and a fifth discharge current 92 is generated. At this time, the negative high voltage of the PIN can be discharged to GND. Because the GND trace is usually thicker than VGL, the corresponding resistance value is much smaller than VGL, so the fifth discharge current 92 is higher than the fourth discharge current 91.

Figure 3:
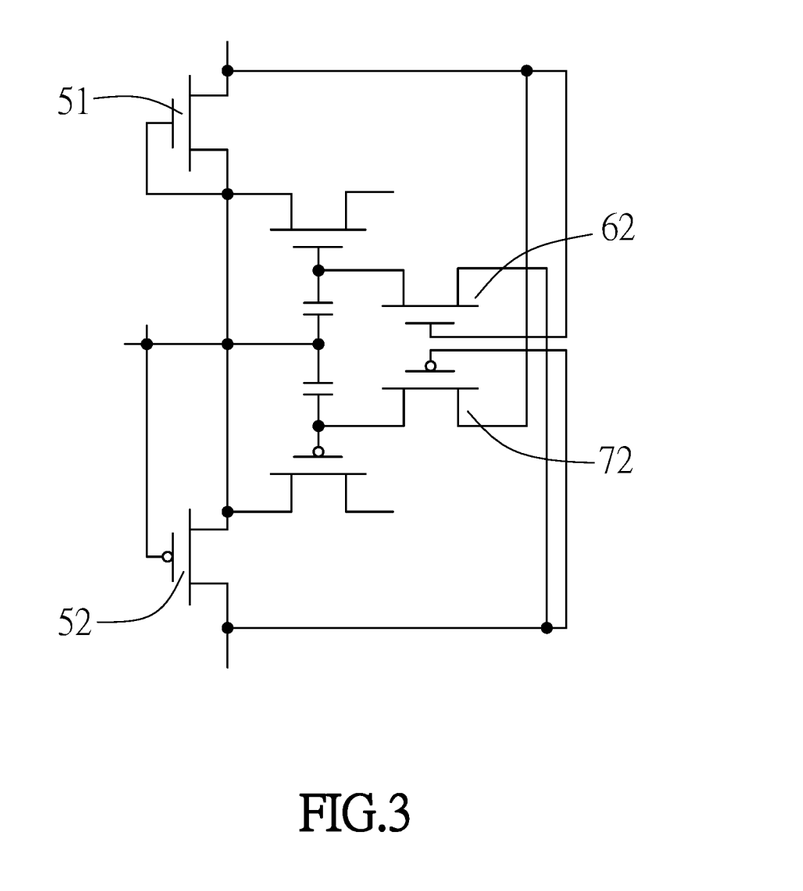
FIG. 3 is a schematic view showing an electrostatic discharge circuit of a display panel of the embodiment of this disclosure.
Figure 4:
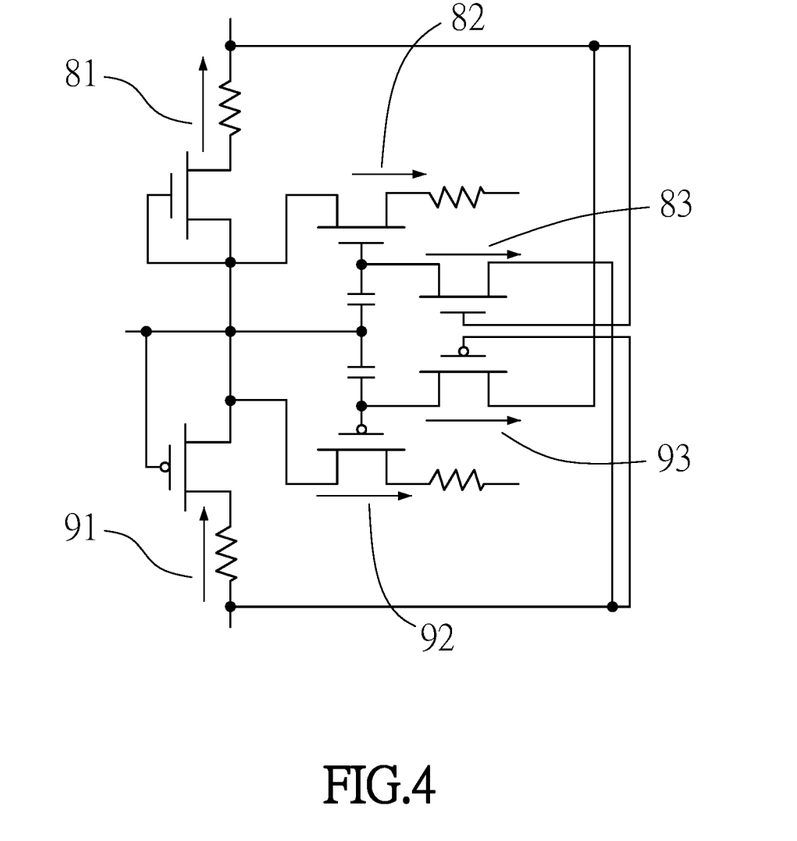
FIG. 4 is a schematic view showing an electrostatic discharge circuit of a display panel of the embodiment of this disclosure.

As another embodiment of this disclosure, an electrostatic discharge circuit 11 comprises a first discharge unit, a second discharge unit 6 and a third discharge unit 7. The first discharge unit comprises a first transistor and a second transistor, a source of the first transistor is connected to a high level terminal, a gate and a drain of the first transistor are connected together to form a first pole, a gate and a drain of the second transistor are connected together to form a second pole, the first pole and the second pole are connected together and connected to an electrostatic input terminal 4, and a source of the second transistor is connected to a low level terminal. An input terminal of the second discharge unit 6 is connected to the electrostatic input terminal 4, and an output terminal of the second discharge unit 6 is connected to a common terminal 3; and an input terminal of the third discharge unit 7 is connected to the electrostatic input terminal 4, and an output terminal of the third discharge unit 7 is connected to the common terminal 3. The second discharge unit 6 and the third discharge unit 7 are connected to and cooperate with the first discharge unit, no matter whether there is a positive or negative high voltage instantaneously applied to the electrostatic input 4, respectively cooperating with the second discharge unit 6 and the third discharge unit 7 outside the first discharge unit can increase the ESD discharge current path, so that the speed and amount of discharge can be increased, a better protection effect on the display panel is achieved, and the lifetime is extended. The second discharge unit 6 comprises a third transistor, a first capacitor 63 and a fifth transistor, and an input terminal and a control terminal of the third transistor are connected to the electrostatic input terminal 4, and an output terminal of the third transistor is connected to the common terminal 3; the first terminal of the first capacitor 63 is connected to the electrostatic input terminal 4, and the second terminal of the first capacitor 63 is connected to a control terminal of third transistor; an input terminal of the fifth transistor is connected to the second terminal of the first capacitor 63, the control terminal of the fifth transistor is connected to the high level terminal, and an output terminal of the fifth transistor is connected to the low level terminal; the third discharge unit 7 comprises a fourth transistor, a second capacitor 73 and a sixth transistor, and an input terminal and a control terminal of the fourth transistor are connected to the electrostatic input terminal 4, and an output terminal of the fourth transistor is connected to the common terminal 3; the first terminal of the second capacitor 73 is connected to the electrostatic input terminal 4, and the second terminal of the second capacitor 73 is connected to the control terminal of the fourth transistor; and an input terminal of the sixth transistor is connected to the second terminal of the second capacitor 73, the control terminal of the sixth transistor is connected to the low level terminal, and an output terminal of the sixth transistor is connected to the high level terminal.

The second discharge unit 6 and the third discharge unit 7 respectively discharge through the third transistor and the fourth transistor, and the configuration is simple, effective and reliable. According to the properties that the capacitor can block the DC, conduct the AC, conduct the high frequency and block the low frequency, when the voltage range is from VGL to VGH, the second discharge unit 6 and the third discharge unit 7 do not work. At the same time, when the voltage range is not from VGL to VGH, for example, when there is applied with a positive high voltage instantaneously, the second discharge unit 6 can work normally, and does not generate the current of VGL left through the second transistor. For example, when there is applied with a negative high voltage instantaneously, the third discharge unit 7 can work normally. So, if the input voltage range of the PIN ranges from VGL to VGH, this capacitor and transistor do not operate because the capacitor in the DC current can be considered as an open circuit. At the positive voltage, the fifth transistor, which is turned on, further completes the discharge function of the second discharge unit 6, and the potential of the second terminal of the first capacitor 63 is pulled to be consistent with the common terminal 3 at the same time. In this manner, when the voltage range is from VGL to VGH, the third transistor cannot be turned on to discharge and affect the normal work of the protection circuit. At the negative voltage, the sixth transistor, which is turned on, further completes the discharge function of the second discharge unit 7, and the potential of the second terminal of the first capacitor 73 is pulled to be consistent with the common terminal 3 at the same time. In this manner, when the voltage range is from VGL to VGH, the fourth transistor cannot be turned on to discharge and affect the normal work of the protection circuit.

Specifically, as shown in FIGS. 3 and 4, and FIG. 4 can be looked as the actual equivalent circuit of FIG. 3, the first discharge unit comprises a first N-type transistor 51 and a second P-type transistor 52, and a source of the first N-type transistor 51 is connected to the high level terminal, a gate and a drain of the first N-type transistor 51 are connected together to form a first pole, a gate and a drain of the second P-type transistor 52 are connected together to form a second pole, the first pole and the second pole are connected together and connected to the electrostatic input terminal 4, and a source of the second P-type transistor 52 is connected to the low level terminal. The second discharge unit 6 comprises a third N-type transistor 61, a first capacitor 63 and a fifth N-type transistor 62, and a source of the third N-type transistor 61 is connected to the gate of the first N-type transistor 51, a drain of the third N-type transistor 61 is connected to the common terminal 3, the common terminal 3 is grounded, the first terminal of the first capacitor 63 is connected to the electrostatic input terminal 4, the second terminal of the first capacitor 63 is connected to a gate of the third N-type transistor 61, a source of the fifth N-type transistor 62 is connected to the second terminal of the first capacitor 63, a gate of the fifth N-type transistor 62 is connected to the high level terminal, and a drain of the fifth N-type transistor 62 is connected to the low level terminal. The third discharge unit 7 comprises a fourth P-type transistor 71, a second capacitor 73 and a sixth P-type transistor 72, and a source of the fourth P-type transistor 71 is connected to the gate of the second P-type transistor 52, a drain of the fourth P-type transistor 71 is connected to the common terminal 3, the common terminal 3 is grounded, the first terminal of the second capacitor 73 is connected to the electrostatic input terminal 4, the second terminal of the second capacitor 73 is connected to a gate of the fourth P-type transistor 71, a source of the sixth P-type transistor 72 is connected to the second terminal of the second capacitor 73, a gate of the sixth P-type transistor 72 is connected to the low level terminal, and a drain of the sixth P-type transistor 72 is connected to the high level terminal. Because the PIN potential instantaneously becomes high, the potential of the point connected between the second terminal of the capacitor and the gate of the third N-type transistor 61 also becomes high at the same time under capacitive coupling special effects, and the third N-type transistor 61 is also turned on. At this time, the positive high voltage of the PIN can be discharged to GND. Because the GND trace is usually thicker than VGL, the corresponding resistance value is much smaller than VGL, so the second discharge current 82 is higher than the first discharge current 81. However, the fifth N-type transistor 62 also pulls the potential of the point connected between the second terminal of the first capacitor 63 and the gate of the third N-type transistor 61 to GND at the same time. So, when there is a large positive voltage instantaneously applied to the PIN, the discharged current is the sum of the first discharge current 81, the second discharge current 82 and a third discharge current 83, which is also higher, and is higher than the total discharge current generated when the first discharge unit solely acts, to have a better protection effect. Because the PIN potential instantaneously becomes negative, the second terminal of the second capacitor 73 also becomes negative at the same time under capacitive coupling special effects, the fourth P-type transistor 71 is also turned on, and the fifth discharge current 92 is generated. At this time, the negative high voltage of the PIN can be discharged to GND. Because the GND trace is usually thicker than VGL, the corresponding resistance value is much smaller than VGL, so the fifth discharge current 92 is higher than the fourth discharge current 91. However, the sixth P-type transistor 72 may also be turned on at the same time, the first discharge current 81 is generated, and then the second terminal of the second capacitor 73 is pulled to the VGH. So, when there is a large negative voltage instantaneously applied to the PIN, the discharged current is the sum of the fourth discharge current 91, the fifth discharge current 92 and a sixth discharge current 93, which is also higher, and is higher than the total discharge current generated when the first discharge unit solely acts, to have a better protection effect.

Of course, the second discharge unit 6 and the third discharge unit 7 may also be configured as follows. The second discharge unit 6 comprises a third N-type transistor, a first capacitor 63 and a fifth N-type transistor 62, and a source of the third N-type transistor is connected to the gate of the first N-type transistor 51, a drain of the third N-type transistor is connected to the common terminal 3, the common terminal 3 is grounded, the first terminal of the first capacitor 63 is connected to the electrostatic input terminal 4, the second terminal of the first capacitor 63 is connected to a gate of the third N-type transistor 61, a source of the fifth N-type transistor 62 is connected to the second terminal of the first capacitor 63, a gate of the fifth N-type transistor 62 is connected to the high level terminal, and a drain of the fifth N-type transistor 62 is connected to the low level terminal. The third discharge unit 7 comprises a fourth N-type transistor, a second capacitor 73 and a sixth P-type transistor 72, and a source of the fourth N-type transistor is connected to the gate of the second P-type transistor 52, a drain of the fourth N-type transistor is connected to the common terminal 3, the common terminal 3 is grounded, the first terminal of the second capacitor 73 is connected to the electrostatic input terminal 4, the second terminal of the second capacitor 73 is connected to a gate of the fourth N-type transistor 71, a source of the sixth P-type transistor 72 is connected to the second terminal of the second capacitor 73, a gate of the sixth P-type transistor 72 is connected to the low level terminal, and a drain of the sixth P-type transistor 72 is connected to the high level terminal.

It should be noted that, in the above embodiments, material of the substrate 10 can be selected from the group consisting of glass, plastic and the likes.

In the above embodiments, the display panel comprises a liquid crystal panel, an OLED (Organic Light-Emitting Diode) panel, a QLED (Quantum Dot Light Emitting Diodes) panel, a curved panel, a plasma panel and the likes. Taking a liquid crystal panel as an example, the liquid crystal panel comprises a TFT substrate (Thin Film Transistor Substrate) and a CF substrate (Color Filter Substrate). The TFT substrate is disposed opposite to the CF substrate, and liquid crystal and a photo spacer (PS) are disposed between the TFT substrate and the CF substrate. A thin film transistor (TFT) is disposed at the TFT substrate, and a color filter layer is disposed at the CF substrate.

In the above embodiments, the CF substrate can comprise a TFT array. The color filter and the TFT array can be formed on the same substrate 10. The TFT substrate can comprise color filter layer.

In the above embodiments, the display panel of this disclosure can be a curved panel.

Figure 6:
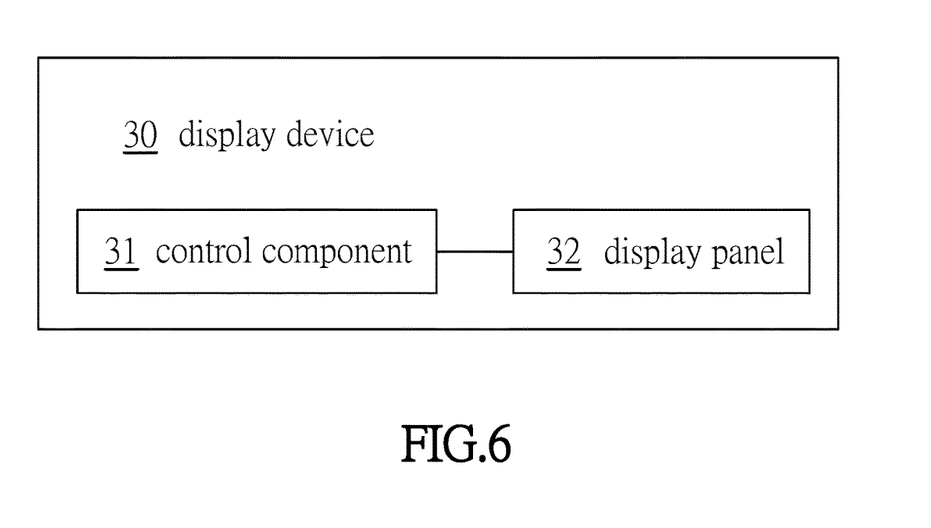
FIG. 6 is a schematic structure view showing a display device of the embodiment of this disclosure.

Referring to FIG. 6, this implementation method discloses a display device 30. The display device 30 comprises a control component 31, and a display panel 32 of this disclosure, and the display panel is taken as an example to be described in detail hereinabove. It is to be described that the above-mentioned description of the display panel structure is also applicable to the display device in the embodiment of this disclosure. When the display device of the embodiment of this disclosure is a liquid crystal display, the liquid crystal display comprises a backlight module, and the backlight module serves as a light source for supplying the light source with the adequate brightness and uniform distribution. The backlight module of this embodiment may pertain to a front lighting type, and may also pertain to a backlight type. It is to be described that the backlight module of this embodiment is not limited thereto.

The above contents with the specific embodiments of the present invention is further made to the detailed description, and specific embodiments of the present invention should not be considered limited to these descriptions. Those of ordinary skill in the art for the present invention, without departing from the spirit of the present invention, can make various simple deduction or replacement, and should be deemed to belong to the scope of the present invention.

What is claimed is:

1. An electrostatic discharge circuit, comprising:
a first discharge unit comprising a first transistor and a second transistor, wherein a source of the first transistor is connected to a high level terminal, a gate and a drain of the first transistor are connected together to form a first pole, a gate and a drain of the second transistor are connected together to form a second pole, the first pole and the second pole are connected together and connected to an electrostatic input terminal, and a source of the second transistor is connected to a low level terminal;
a second discharge unit, wherein an input terminal of the second discharge unit is connected to the electrostatic input terminal, an output terminal of the second discharge unit is connected to a common terminal, and the second discharge unit functions to discharge when a positive voltage is applied; and
a third discharge unit, wherein an input terminal of the third discharge unit is connected to the electrostatic input terminal, an output terminal of the third discharge unit is connected to the common terminal, and the third discharge unit functions to discharge when a negative voltage is applied.

2. The electrostatic discharge circuit according to claim 1, wherein the second discharge unit comprises a first electroconductive wire having one end connected to the common terminal, and the common terminal is grounded; or the second discharge unit comprises a first electroconductive wire having one end connected to the common terminal, the electrostatic discharge circuit is disposed on a display panel, and the common terminal is connected to a common voltage terminal of the display panel.

3. The electrostatic discharge circuit according to claim 1, wherein the third discharge unit comprises a second electroconductive wire having one end connected to the common terminal, and the common terminal is grounded; or the third discharge unit comprises a second electroconductive wire having one end connected to the common terminal, and the common terminal is connected to a common voltage terminal of the display panel.

4. The electrostatic discharge circuit according to claim 1, wherein:
the second discharge unit comprises a third transistor, wherein an input terminal and a control terminal of the third transistor are connected to the electrostatic input terminal, and an output terminal of the third transistor is connected to the common terminal; and
the third discharge unit comprises a fourth transistor, wherein an input terminal and a control terminal of the fourth transistor are connected to the electrostatic input terminal, and an output terminal of the fourth transistor is connected to the common terminal.

5. The electrostatic discharge circuit according to claim 4, wherein:
the second discharge unit comprises a first capacitor, wherein a first terminal of the first capacitor is connected to the electrostatic input terminal, and a second terminal of the first capacitor is connected to the control terminal of the third transistor; and
the third discharge unit comprises a second capacitor, wherein a first terminal of the second capacitor is connected to the electrostatic input terminal, and a second terminal of the second capacitor is connected to the control terminal of the fourth transistor.

6. The electrostatic discharge circuit according to claim 5, wherein:
the second discharge unit comprises a fifth transistor, wherein an input terminal of the fifth transistor is connected to the second terminal of the first capacitor, a control terminal of the fifth transistor is connected to the high level terminal, and an output terminal of the fifth transistor is connected to the low level terminal; and
the third discharge unit comprises a sixth transistor, wherein an input terminal of the sixth transistor is connected to the second terminal of the second capacitor, a control terminal of the sixth transistor is connected to the low level terminal, and an output terminal of the sixth transistor is connected to the high level terminal.

7. The electrostatic discharge circuit according to claim 6, wherein the first transistor is a first N-type transistor, the second transistor is a second P-type transistor, the third transistor is a third N-type transistor, the fourth transistor is a fourth P-type transistor, the fifth transistor is a fifth N-type transistor, and the sixth transistor is a sixth P-type transistor.

8. The electrostatic discharge circuit according to claim 6, wherein the first transistor is a first N-type transistor, the second transistor is a second P-type transistor, the third transistor is a third P-type transistor, the fourth transistor is a fourth N-type transistor, the fifth transistor is a fifth N-type transistor, and the sixth transistor is a sixth P-type transistor.

9. A display panel, comprising:
a substrate, wherein an active switch is disposed on the substrate;
signal lines, which are disposed on the substrate and coupled to the active switch, wherein the signal lines comprise multiple scan lines and multiple data lines, and the multiple data lines and the multiple scan lines successively intersect to form multiple pixel areas; and
the electrostatic discharge circuit according to claim 1;
wherein the electrostatic discharge circuit is disposed on the substrate.

10. The display panel according to claim 9, further comprising:
a gate drive circuit and a source drive circuit, which are disposed on the substrate.

11. The electrostatic discharge circuit according to claim 9, wherein the second discharge unit comprises a first electroconductive wire having one end connected to the common terminal, and the common terminal is grounded; or the second discharge unit comprises a first electroconductive wire having one end connected to the common terminal, the electrostatic discharge circuit is disposed on a display panel, and the common terminal is connected to a common voltage terminal of the display panel.

12. The electrostatic discharge circuit according to claim 9, wherein the third discharge unit comprises a second electroconductive wire having one end connected to the common terminal, and the common terminal is grounded; or the third discharge unit comprises a second electroconductive wire having one end connected to the common terminal, and the common terminal is connected to a common voltage terminal of the display panel.

13. The electrostatic discharge circuit according to claim 9, wherein:
the second discharge unit comprises a third transistor, wherein an input terminal and a control terminal of the third transistor are connected to the electrostatic input terminal, and an output terminal of the third transistor is connected to the common terminal; and
the third discharge unit comprises a fourth transistor, wherein an input terminal and a control terminal of the fourth transistor are connected to the electrostatic input terminal, and an output terminal of the fourth transistor is connected to the common terminal.

14. The electrostatic discharge circuit according to claim 13, wherein:
the second discharge unit comprises a first capacitor, wherein a first terminal of the first capacitor is connected to the electrostatic input terminal, and a second terminal of the first capacitor is connected to the control terminal of the third transistor; and
the third discharge unit comprises a second capacitor, wherein a first terminal of the second capacitor is connected to the electrostatic input terminal, and a second terminal of the second capacitor is connected to the control terminal of the fourth transistor.

15. The electrostatic discharge circuit according to claim 14, wherein:
the second discharge unit comprises a fifth transistor, wherein an input terminal of the fifth transistor is connected to the second terminal of the first capacitor, a control terminal of the fifth transistor is connected to the high level terminal, and an output terminal of the fifth transistor is connected to the low level terminal; and
the third discharge unit comprises a sixth transistor, wherein an input terminal of the sixth transistor is connected to the second terminal of the second capacitor, a control terminal of the sixth transistor is connected to the low level terminal, and an output terminal of the sixth transistor is connected to the high level terminal.

16. The electrostatic discharge circuit according to claim 15, wherein the first transistor is a first N-type transistor, the second transistor is a second P-type transistor, the third transistor is a third N-type transistor, the fourth transistor is a fourth P-type transistor, the fifth transistor is a fifth N-type transistor, and the sixth transistor is a sixth P-type transistor.

17. The electrostatic discharge circuit according to claim 15, wherein the first transistor is a first N-type transistor, the second transistor is a second P-type transistor, the third transistor is a third P-type transistor, the fourth transistor is a fourth N-type transistor, the fifth transistor is a fifth N-type transistor, and the sixth transistor is a sixth P-type transistor.

18. An electrostatic discharge circuit, comprising:
a first discharge unit comprising a first N-type transistor and a second P-type transistor, wherein a source of the first N-type transistor is connected to a high level terminal, a gate and a drain of the first N-type transistor are connected together to form a first pole, a gate and a drain of the second P-type transistor are connected together to form a second pole, the first pole and the second pole are connected together and connected to an electrostatic input terminal, and a source of the second P-type transistor is connected to a low level terminal;
a second discharge unit comprising a third N-type transistor, a first capacitor, and a fifth N-type transistor, wherein a source of the third N-type transistor is connected to the gate of the first N-type transistor, a drain of the third N-type transistor is connected to a common terminal, the common terminal is grounded, a first terminal of the first capacitor is connected to the electrostatic input terminal, a second terminal of the first capacitor is connected to a gate of the third N-type transistor, a source of the fifth N-type transistor is connected to the second terminal of the first capacitor, a gate of the fifth N-type transistor is connected to the high level terminal, a drain of the fifth N-type transistor is connected to the low level terminal, and the second discharge unit functions to discharge when a positive voltage is applied; and
a third discharge unit comprising a fourth P-type transistor, a second capacitor and a sixth P-type transistor, wherein a source of the fourth P-type transistor is connected to the gate of the second P-type transistor, a drain of the fourth P-type transistor is connected to the common terminal, the common terminal is grounded, a first terminal of the second capacitor is connected to the electrostatic input terminal, a second terminal of the second capacitor is connected to a gate of the fourth P-type transistor, a source of the sixth P-type transistor is connected to the second terminal of the second capacitor, a gate of the sixth P-type transistor is connected to the low level terminal, a drain of the sixth P-type transistor is connected to the high level terminal, and the third discharge unit functions to discharge when a negative voltage is applied.

19. The electrostatic discharge circuit according to claim 18, wherein the second discharge unit comprises a first electroconductive wire having one end connected to the common terminal, and the common terminal is grounded; or the second discharge unit comprises a first electroconductive wire having one end connected to the common terminal, the electrostatic discharge circuit is disposed on a display panel, and the common terminal is connected to a common voltage terminal of the display panel.

20. The electrostatic discharge circuit according to claim 18, wherein the third discharge unit comprises a second electroconductive wire having one end connected to the common terminal, and the common terminal is grounded; or the third discharge unit comprises a second electroconductive wire having one end connected to the common terminal, and the common terminal is connected to a common voltage terminal of the display panel.

* * * * *